United States Patent [19]

McCannon

[11] Patent Number: 5,050,312
[45] Date of Patent: Sep. 24, 1991

[54] GRAPHIC CALCULATOR

[75] Inventor: Dominic V. McCannon, Birkenhead, England

[73] Assignee: RJP International Limited, Central, Hong Kong

[21] Appl. No.: 352,120

[22] Filed: May 15, 1989

[30] Foreign Application Priority Data

May 16, 1988 [GB] United Kingdom ............... 8811538

[51] Int. Cl.$^5$ ............................ G01B 3/02; B43L 7/00
[52] U.S. Cl. ........................................ 33/700; 33/1 N; 33/494
[58] Field of Search ................. 33/700, 483, 486, 494, 33/1 N; 364/562, 561

[56] References Cited

U.S. PATENT DOCUMENTS

| | | | |
|---|---|---|---|
| 407,515 | 7/1889 | Duffield | 33/1 N |
| 1,975,400 | 10/1934 | Mayfield | 33/1 N |
| 4,158,229 | 6/1979 | Woo | 33/700 X |
| 4,839,833 | 6/1989 | Parhiskari | 33/491 X |

FOREIGN PATENT DOCUMENTS

| | | | |
|---|---|---|---|
| 3628266 | 2/1988 | Fed. Rep. of Germany | 33/494 |
| 2458047 | 12/1980 | France | 33/700 |
| 0161601 | 10/1982 | Japan | 33/494 |
| 0202304 | 10/1985 | Japan | 33/1 N |
| 2137002 | 9/1984 | United Kingdom | 33/700 |
| 2150888 | 7/1985 | United Kingdom | 33/494 |

Primary Examiner—Harry N. Haroian
Attorney, Agent, or Firm—Pravel, Gambrell, Hewitt, Kimball & Krieger

[57] ABSTRACT

A graphic calculator (10) for use in technical drawing has means for selectively displaying one of a plurality of sets of division markers wherein each set corresponds to a set of scaled division markers of a particular scale rule. Such a calculator effectively provides a scale rule whose divisions may be altered as desired.

Also disclosed is an electronic protractor having a transparent cross-hair viewer for accurately locating the protractor over the lines forming the angle to be measured and means for recording the point at which at least one of said lines extends from under a measuring edge of said protractor.

22 Claims, 5 Drawing Sheets

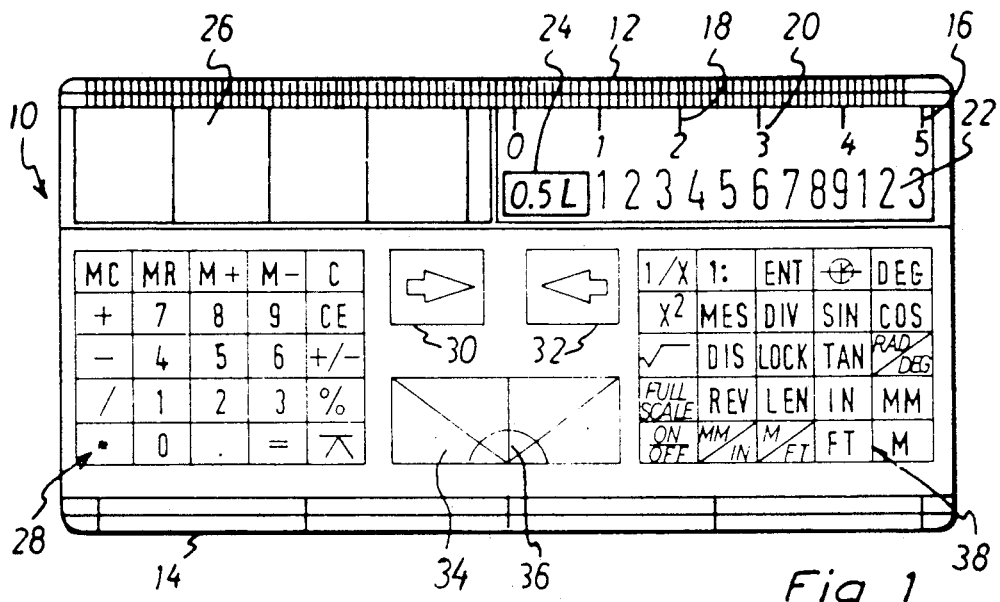
Fig_1
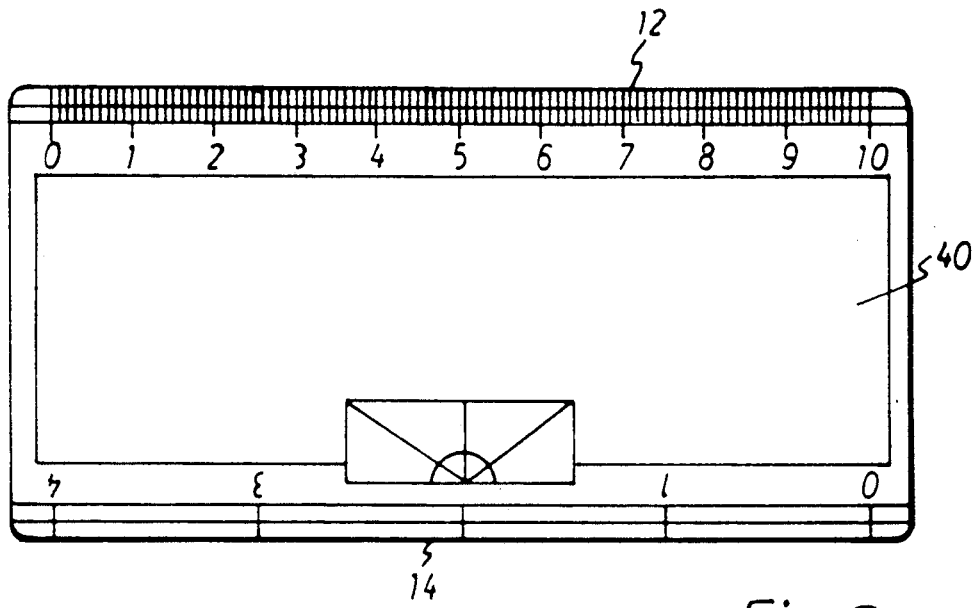
Fig_2

GRAPHIC CALCULATOR

DESCRIPTION

The present invention relates to electronic measurement and calculation devices, and in particular to an electronic scale.

At present, those involved in technical drawing, for example, architects, engineers and surveyors, use standard wooden or plastics scale rules, calibrated in such scales as 1:100, 1:1250 and so on.

Such scale rules commonly comprise calibrations in more than one scale so that a single rule may be used when working with drawings in different scales. However, the number of different sets of scale calibrations that may be represented on a particular scale rule is limited and so a draughtsman often requires more than one scale rule. In particular, the requirement for more than one scale rule often arises when the draughtsman is executing drawing tasks involving scale conversions.

Also, the function of present scale rules is strictly limited to one of measuring dimensions on a scale drawing or of facilitating drawing in a particular scale.

The need frequently arises to measure lengths or angles represented on a drawing and then to perform calculations with these measurements, so as to determine further values such as those of volume and area.

At present, such task involve selecting a scale rule comprising calibration at an appropriate scale, taking the appropriate measurements, recording these measured values and then performing the necessary calculations with these values. If the results are than to be incorporated into a drawing the appropriate scale must be chosen and the measurement read and marked on the drawing as required. It is also sometimes necessary to use equal or exponential divisions/calibrations not represented on standard scale rules and present methods of achieving this for drawing purposes are cumbersome. Present scale rules are also limited in that their use does not extend to one of measured or displaying angles. Also, separate metric and imperial rules may be necessary, corresponding to the particular requirements of the drawing, and conversion between the two systems requires time consuming and tedious calculations.

One known device is disclosed in GB 2137002 which is an electronic scale which can be used to display equally-spaced markers (e.g. for use in drawing graphs), but it is not possible to define or ascertain a scaled distance which a user may wish to be represented by the distance between two adjacent markers, without further intricate calculation. A further device is disclosed in GB 2137002, but this would appear to relate to the measurement of the distance between two points on a drawing and the display of the distance numerically to allow further calculation to be performed. The inverse operation is also possible.

However, both the prior art devices suffer from the disadvantage that if several measurements are to be made, or several lines drawn, in the same scale, separate calculation of the distances of measurements are necessary, making the operation time consuming. Moreover, there is no indication as to which scale is being used. This must be worked out separately, if desired.

It would be advantageous if a versatile scale rule could be provided which could be used to meet the drawing and measurement requirements to be performed at any particular scale.

It would be a further advantage if a scale rule could be provided which facilitates the measurement and display of dimensions relevant to a scale drawing and is also capable of performing calculations with those measured values.

It would also be advantageous if a measuring device could be provided which includes the function of angular measurement and display, and which is capable of performing calculations with such measured values.

According to one aspect of the present invention there is provided an electronic measure comprising means for selectively displaying one of a plurality of sets of division markers wherein each set corresponds to a set of scaled division markers of a particular scale rule.

Preferably, the division markers are displayed on an elongate display panel, which advantageously comprises a liquid crystal display panel. As such, the elongate liquid crystal display panel preferably comprises a plurality of liquid crystal display segments, disposed in increments of 0.5mm. As a further feature the elongate liquid crystal display panel may also comprise display segments providing numerical annotation in the region of the division markers.

Preferably, the measure further comprises means for entering and recording the separation between the two points on a scaled drawing, means for entering the relevant scale of the drawing and means for calculating and numerically displaying the real distance represented by the spacing of the points on the drawing having regard to the scale of the drawing. The means for entering the relevant scale may also be adapted to initiate a display of a set of division markers, on the elongate display, of a scale rule, corresponding to the scale of the drawing. The measure may also include a numerical display for indicating the scale in use.

Preferably, the measure is also capable of displaying exponential divisions and also proportioning systems such as the Fibonacci.

The means for entering and recording the separation between two points on a scaled drawing may comprise at least one movable cursor disposed on the elongate display panel. As such, each element of the display which provides for the movable cursor may also comprise the display element which provides the division marker. In this manner, when a particular display element is required to simultaneously indicate a cursor and a division marker, the display element is adapted to vary in size, intensity or alternatively it is adapted to flash.

As a further advantageous feature, the measure comprises means for entering a real value to be represented by the separation of points on a scale drawing, means for entering the relevant scale of the drawing and display means for indicating the correct separation of the points on the drawing to represent that real value. Preferably, the display means comprises an elongate display having at least one movable cursor.

Preferably, the measure further comprises means for measuring and displaying angles. Such angle measuring and displaying means advantageously comprises locating means for facilitating accurate location of the measure over the lines forming the angle to be measured. The measure then also includes means for recording the point at which at least one of the lines extends from below an edge of the measure. As such the electronic measure is adapted to calculate an angle as represented on a drawing. The inverse function is advantageously also possible, in that the electronic measure is adapted to display any required angle to be drawn. The measure advantageously includes a numerical display for displaying the angular value measured or required to be drawn.

Preferably the electronic measure is capable of performing calculations with any of the input values and also comprises a large memory capacity.

The elongate display is preferably located adjacent the complete measuring length of one of the calibrated edges of the electronic measure. The measure also then includes means for recording and indicating the number of complete lengths of the calibrated edge, which, in addition to the length represented by the at least one movable cursor, represents the required separation of points on a drawing.

Alternatively, the elongate display is located along part of the calibrated edge and the measure therefore includes means for indicating the number of part lengths of the calibrated edge which, in addition to the length represented by the at least one movable cursor, represents the required separation of points on a drawing.

According to another aspect of the present invention, there is provided an electronic protractor comprising means for accurately locating the protractor over the lines forming the angle to be measured and means for recording the point at which at least one of said line extends from under a measuring edge of said protractor.

Preferably, the locating means comprises a transparent cross-hair viewer so that the protractor may be accurately located over the intersection of the lines forming the angle. The means for recording the point at which the at least one line extends from under a measuring edge, advantageously comprises a liquid crystal display screen having at least one movable cursor.

Advantageously, the electronic protractor is adapted to display any required angle by means of at least one movable cursor provided on the liquid crystal display having regard to the location of the electronic protractor on the drawing surface.

The protractor may also incorporate a plurality of common calculator functions so that the angular values measured and/or displayed may be directly used in calculations. The invention is described further hereinafter, by way of example only, with reference to the accompanying drawings, in which:

FIG. 1 is a plan view of an electronic measure in accordance with one embodiment of the present invention;

FIG. 2 is a plan view of the reverse side of the electronic measure of FIG. 1;

Figure 3:
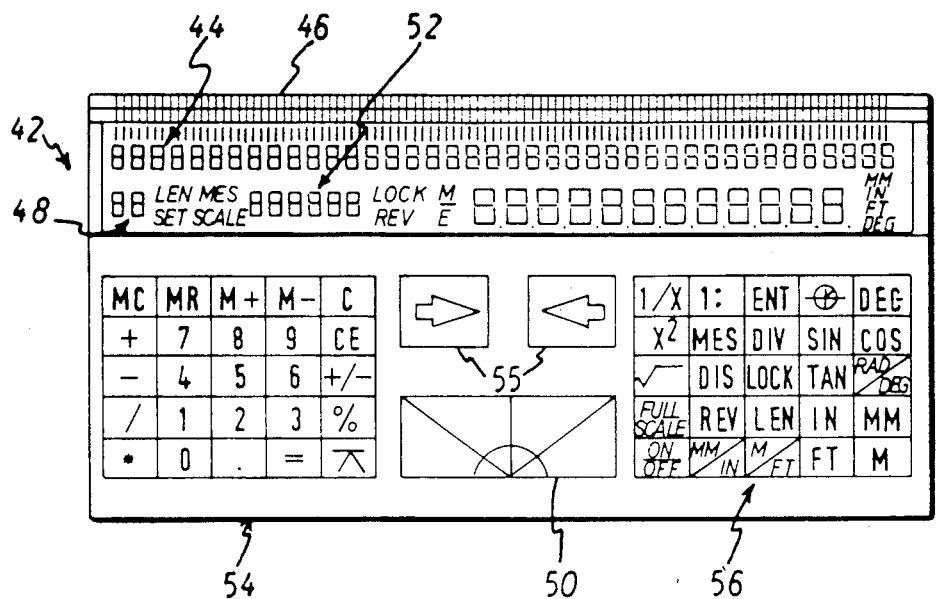
FIG. 3 is a plan view of an electronic measure in accordance with another embodiment of the present invention.
Figure 8:
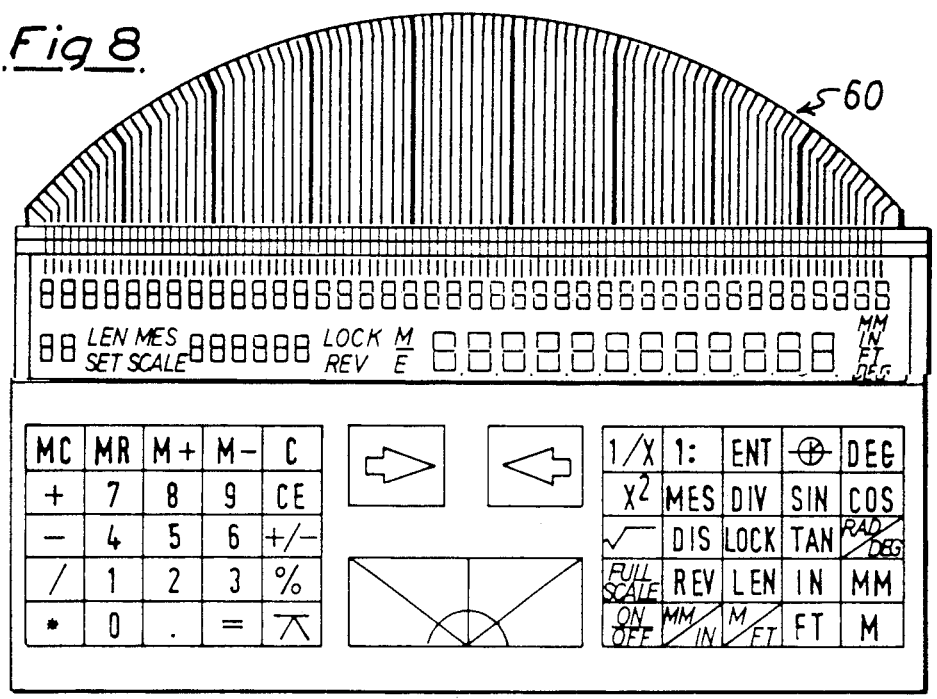
Figure 9:
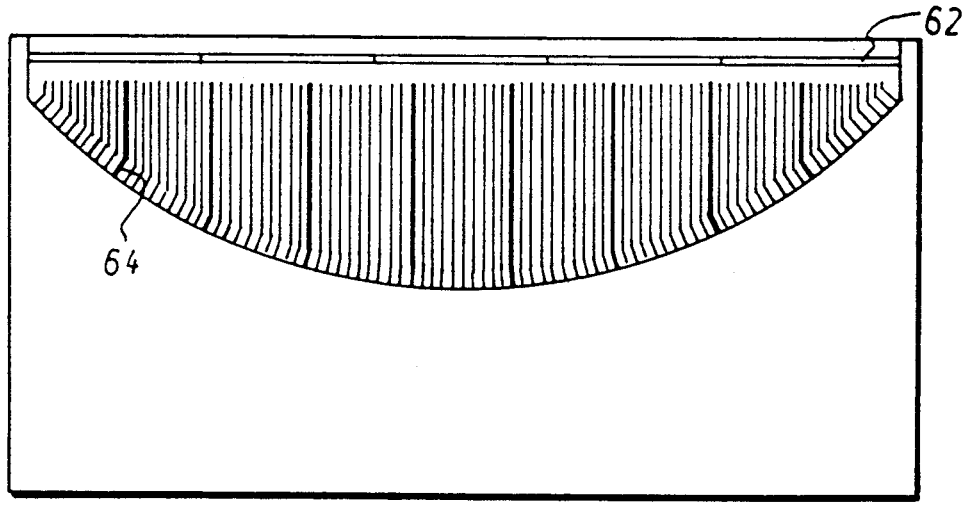

FIG. 7(a-g) is a view of the LCD display of FIG. 3 embodiment, in several different states; and FIGS. 8 and 9 are plan and inverted plan views of a modification to the FIG. 3 embodiment. FIG. 1 illustrates a rectangular electronic measure 10, having dimensions 108mm in length and 52mm in width one chamfered measuring edge 12 of which is calibrated in millimeters and another edge 14, opposite edge 12, is calibrated in inches. The edge 12 comprises one hundred millimeter calibrations and thus provides a calibrated measuring edge of overall length, 10cm. The measuring edge 14 is calibrated into a 4" (10.16cm) length. An elongate liquid crystal display 16 is disposed adjacent the calibrated edge 12, and has dimensions 54mm in length and 15mm in width. As such, the elongate liquid crystal display 16 is disposed adjacent the section of the calibrated edge 12 from the 48mm calibration to the 100mm calibration. For ease of reading, the section of the calibrated edge from the 0mm calibration to the 50mm calibration is shaded. An array of solar cells 26 is provided adjacent the calibrated edge 12, from the 0mm calibration to the 46mm calibration and has similar dimension to the liquid crystal display 16. The liquid crystal display is adapted to comprise a set of division markers 18, numerical annotation 20 for the division markers 18, a twelve figure numerical calculator display 22 and also a numerical indication 24 of a multiple of half lengths of the calibrated edge 12. The half length indicator 24 is represented in a frame but may alternatively be represented as fainter characters. Also, the scale in use may be displayed by the liquid crystal display 16. The division markers 18 and numerical annotation 20, are illustrated as corresponding to a rule calibrated in centimeters, however any required divisions and numerical annotation corresponding to the division markers of a particular scale rule may be selectively displayed.

A plurality of common calculator function keys 28 are disposed on the electronic measure 10 at a location between the solar array 26 and the edge 14. A separate set of function keys 38 are provided at the right hand end of the measure 10 (as shown in FIG. 1) and between the liquid crystal display 16 and edge 14. Two separate cursor activation keys 30 and 32 are located adjacent the edge 14 and between the calculator function keys 28 and the angular function keys 38. The activation keys 30, 32 provide for the controlled two-way movement of a cursor along the elongate liquid crystal display 16. A transparent viewing piece 34 is located in the region between the function keys 38, 28, the liquid crystal display 16 and the activation keys 30, 32. The viewing piece 34 includes cross-hairs 36 which facilitate the accurate positioning of the electronic drawing measure 10 on a particular surface.

Through appropriate manipulation of the scale/ratio keys 28, as well be explained, the electronic measure can be adjusted to operate in any particular scale. When operating in a chosen scale, appropriate division markers 18 on the display 16 are activated so as to represent the divisions of a conventional scale rule corresponding to that particular scale.

FIG. 2 illustrates the reverse side of the electronic measure of FIG. 1. The edge 12 is calibrated and annotated to provide a 10cm rule and the edge 14 is calibrated and annotated to provide a 4" (10.16cm) rule. The region 40 of the reverse side comprises printed diagrams and formulae relevant to the measurements and calculations that will be performed with the electronic measure.

The invention is not restricted to the details of the foregoing embodiment. For example, the electronic measure may be powered by lithium batteries. As such the liquid crystal display 16 may extend adjacent the full length of the calibrated edge 12. The "part-length" display 24 is then adapted to display the multiple of complete lengths that are required in order to measure or draw a required distance. Also, the dimensions of the measure are not restricted to those outlined hereinbefore.

FIG. 3 illustrates an electronic measure 42 having an elongate liquid crystal display 44 which extends along the complete length of the calibrated edge 46 of the device. The liquid crystal display 44 is thus of the order of 10cm in length. As such, the electronic measure is preferably powered by at least one lithium battery. In addition to the display elements outlined hereinbefore, the liquid crystal display 52 also illustrates a scale display element 52 and an integer display 48 for representing the number of complete lengths of the calibrated edge 46 that are necessary to represent or measure, by way of the device, the required length. The electronic measure 42 also illustrates a set of annotated calculator function keys 54 and angular function keys 56 as will be explained. Also provided are two cursor movement keys 55.

A transparent viewing piece 50, for use in angular measurement as hereinbefore described, is also included and is located in the region of the measure 42 corresponding to the mid-point of the calibrated edge, between the two ends of the electronic measure 42. When measuring or displaying angles, the complete length, i.e. two hundred display elements at 0.5mm separation, of the liquid crystal display 44 may be utilised and so the resolution of the measured edge and thus accuracy of the device is enhanced since two hundred liquid crystal display elements are now available for such functions. With the electronic measure illustrated in FIG. 1, only one hundred liquid crystal display elements are available due to the restricted length of the elongate display.

Figure 4:
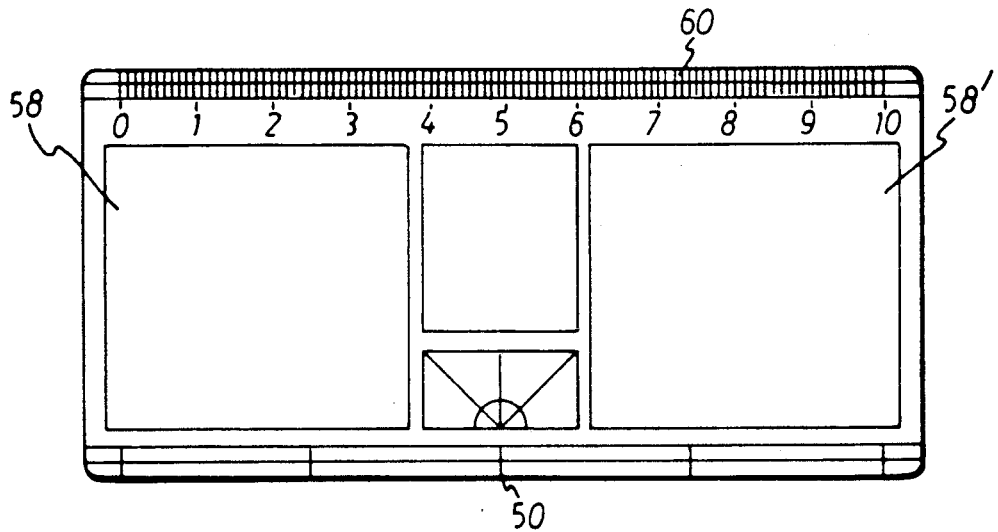
FIG. 4 is a plan view of the reverse side of the electronic measure of FIG. 3.

The reverse side of the electronic measure 42 is illustrated in FIG. 4 and includes one elongate edge 60 calibrated in mm so as to provide a rule 100mm in length. Surfaces 58 and 58' include printed diagrams and other information relevant to the calculations that the electronic measure is to perform. A second edge 50, is calibrated as an inch rule 4" (10.16cm) in length.

Figure 5:
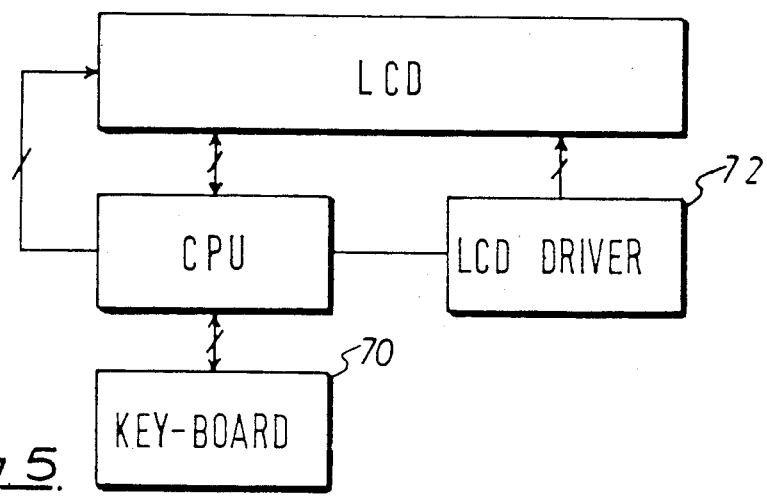
FIG. 5 is a diagrammatic representation of the internal construction of the devices of FIGS. 1 and 3.
Figure 6:
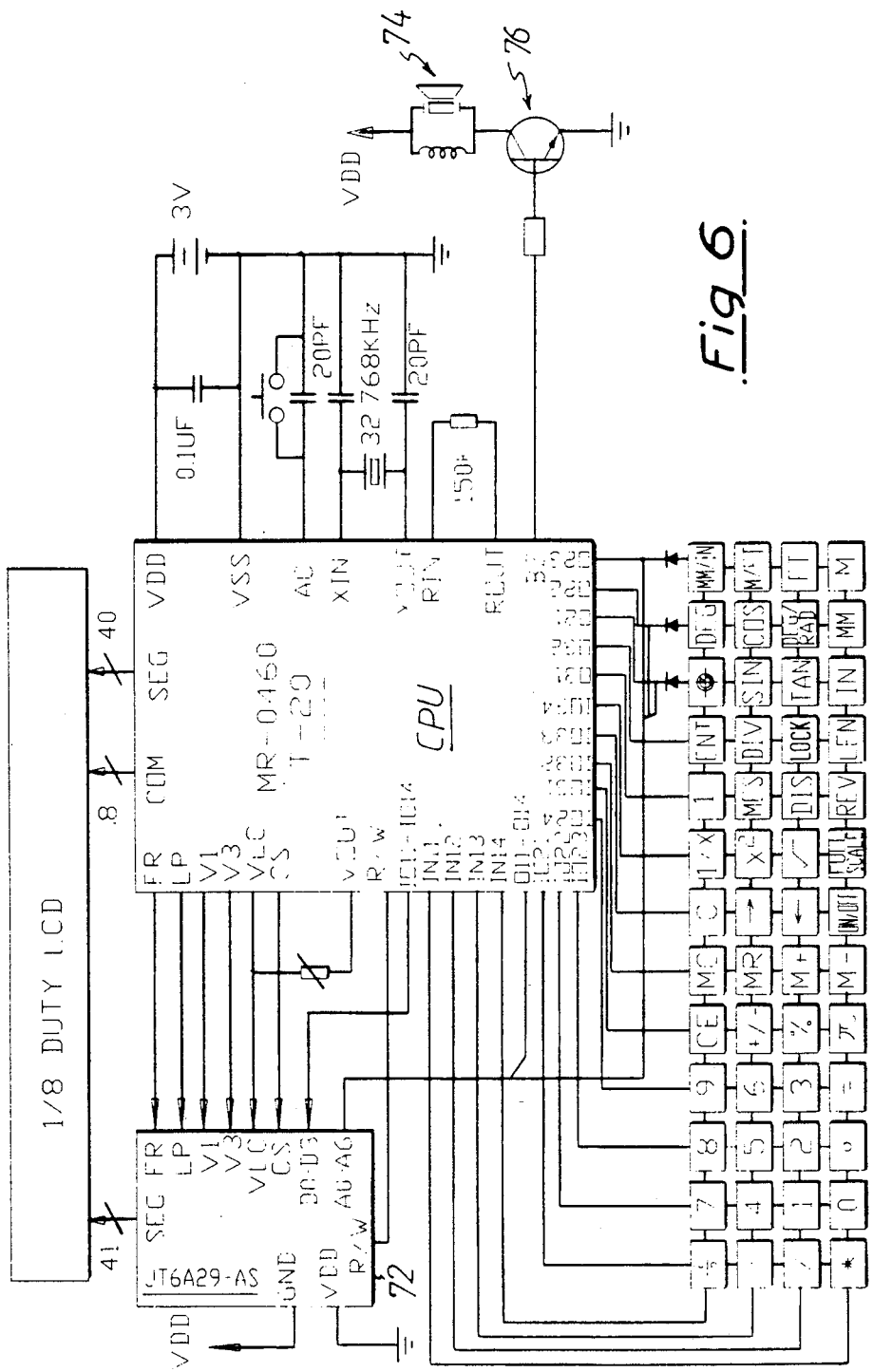
FIG. 6 is a circuit diagram of the FIGS. 1 and 3 embodiments.

The internal construction of the embodiments is shown in FIGS. 5 and 6. The construction of the two embodiments is substantially identical, with the minor alteration that the number of LCD Display segments in the FIG. 1 embodiment is less than that of the FIG. 3 embodiment. The calculator basically comprises a keyboard 70 (comprising the calculator keys 54 and the functions keys 56), a central processor unit (CPU), a liquid crystal display (LCD) and an LCD driver 72. This is shown in more detail in FIG. 6 where the connections of the keys to a MR-0460 T-20 integrated circuit CPU chip are shown. The CPU chip drives a JT6A29-AS LCD driver chip 72, and the two chips control the LCD. The CPU is also adapted to control an audible bleeper, 74, which sounds when the function keys are pressed. It is connected via a transistor 76. The Figure also shows the various components and values thereof connected to certain terminals of the LCD.

The operation of the electronic measure is described below with reference to particular indication and measurement operations.

Figure 7A:
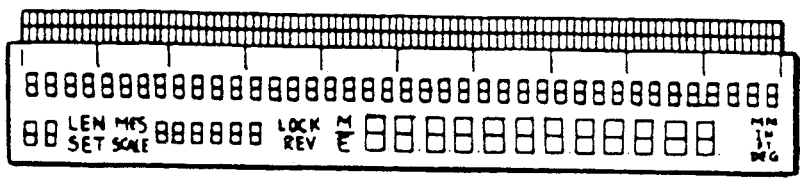
Figure 7B:
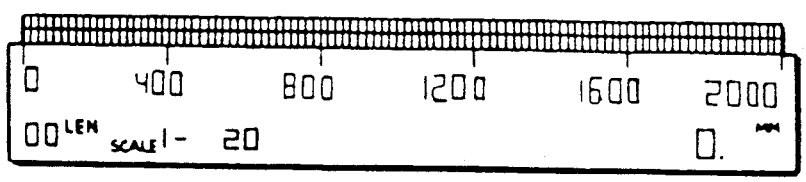
Figure 7C:
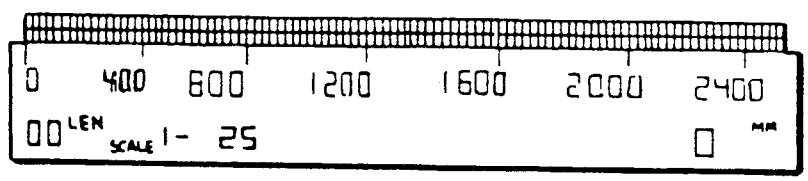

The device is operated as follows. It will be described with reference to the FIG. 3 embodiment, but an analogous operation is used for the FIG. 1 embodiment. It is switched on by pressing the ON/OFF key, wherein the scale is automatically set at 1:1. In order to choose a new scale (e.g. 1:20), the 1: key is pressed for two seconds, whereupon the SET indicator is displayed on the LCD display 44. A tone is also emitted from the bleeper 74. The required scale, in this case 20, is then entered by pressing 2 and 0 keys, and then the ENT key is pressed to enter the scale. The SET indicator is removed, and the SCALE 1-20 indicator is displayed, as seen in FIG. 7(b). As also seen in that Figure, the LCD display also displays the divisions and annotations appropriate to a 1:20 scale rule, and the MM indicator at the right hand end of the display is illuminated, to indicate that the displayed set of scale division markers represent millimeters.

Figure 7D:
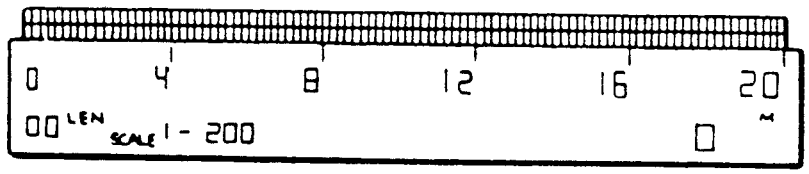
Figure 7E:
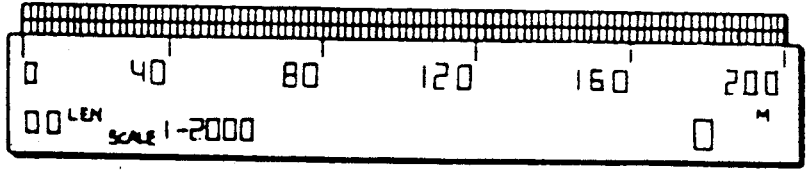
Figure 7F:
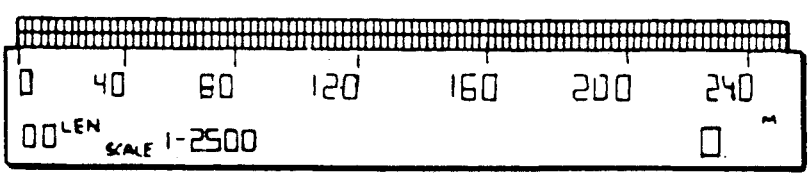

In a similar way, any scale up to 1:9999 can be entered and the appropriate set of scaled division markers and units displayed on the LCD. Three examples of this are shown in FIGS. 7(c) to (f), where scales of 1:25, 1:200, 1:2000 and 1:2500 are input, and the appropriate set of scale division markers is displayed. As seen in FIGS. 7(d) to (f), the units automatically adjust, these three sets of scaled division markers representing meters rather than millimeters.

It is also possible to input a reverse scale of the type n:1. This is done as before, except that the REV key is pressed before the 1: key, the REV indicator also being displayed on the LCD display 44. The appropriate scale and units will then be displayed on the LCD display.

The graphic calculator also includes a "full scale" function, in which the full length of the calibrated edge can be assigned a particular distance which it represents, and the scale of the displayed indicators will be calculated and displayed accordingly. This is done by first pressing the FULL SCALE key for two seconds, whereupon a confirmation tone wil. The digits and units which the full length of the represents are then entered using the number keys of the calculator pad 54 and the IN, MM, FT, M keys of the function keys 56. The ENT key is then depressed and the set of scale division markers, the scale and the units are all automatically indicated on the display. For example, if the full length is taken to be 200m, and is input as described, the display of FIG. 7(e) is displayed.

It is also possible to assign a selected represented length to each major division marker of the set of division markers. For example, as seen in FIG. 7(b), each division marker could be set at 400mm. The scale is then automatically set and displayed. This is achieved by pressing the DIV key for two seconds, producing an audible confirmation tone. The appropriate length and units are then input, and the ENT key is pressed. The set of division markers, the scale and the units are then automatically displayed.

Figure 7G:
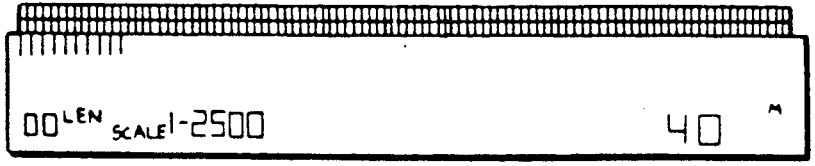

It is also possible to display a length on the LCD display as represented in a particular scale. When the scale has been chosen as before, the length (including the units) is input by pressing the appropriate keys. If any number is already shown on the calculator display, this may be used instead. The DIS key is pressed, and the appropriate length in the scale being used is displayed by a plurality of LCD indicators equal to the length in question, as shown in FIG. 7(g). If the length to be displayed is longer than one full length of the scale, the LEN indicator 48, preceded by a number, will be displayed, indicating how many full lengths of the scale plus the indicated length are required to form the length in the scale being used.

The calculator can also be used to display angles. The angle is entered, followed by the DEG key. DIS is then pressed to display the angle having the crosswires of the transparent viewing piece as its apex. The display will automatically indicate 0 to 90 degrees, 90 to 180 degrees, 180 to 270 degrees or 270 to 360 degrees as appropriate.

It is also possible to measure the length of a distance when in a particular scale. The MES key is pressed, which enters the measurement mode, and produces a flashing cursor on the LCD display. The cursor keys are pressed to move the cursor, and at the required point the ENT key is pressed and the length of that distance is displayed on the calculator display. If the length to be measured is longer than the full length of the scale, the LEN key is pressed the appropriate number of times before the cursor is moved. This will be displayed at the left-hand end of the display at the length display 48.

In order to measure an angle, the quadrant key, between the ENT and the DEG keys, is pressed. The key is pressed once for an angle in the first quadrant, twice for an angle in the second quadrant, and so on. The display will indicate 0 to 90 degrees, 90 to 180 degrees, and so on, as appropriate. The origin of the transparent viewing piece is placed on the origin of the angle, and one side of the angle is located against the reference marker (0°, 90°, 180° or 270°). The cursor keys are then used to align a flashing cursor with the other side of the angle, and the ENT key is pressed, whereupon the angle measured will be indicated on the display.

At any time, the keyboard can be locked by pressing the LOCK key, thus displaying LOCK on the display. The keyboard will then be disabled until the LOCK key is pressed again.

The FIG. 1 embodiment is operated almost identically, without any significant differences.

For a further example, it is assumed that the measure 10 of FIG. 1 has been pre-set, by manipulation of keys 28, to operate in the scale 1:100, and the set of division markers 18 illustrated in FIG. 1 are thus indicated in the display 16. The measure 10 thus functions as a 1:100 scale rule, so that a length of 1cm along the calibrated edge 12 and liquid crystal display 16, will represent a real value of 1 meter. Therefore, if it is required to draw a line to represent a real length of 17.5 meters, appropriate activation of the required keys 28 will cause the half-length indicator 24 to show "1.5 L" i.e. one and a half complete lengths of the calibrated edge 12, and the liquid crystal display will show a cursor at a location 2.5cm from the division marker annotated with a 'zero' (FIG. 1). These values indicate that the length of the line to be drawn, must be equal to one and a half full lengths of the calibrated edge 12 plus the length along the liquid crystal display indicated by the cursor. A reverse function key REV also allows the liquid crystal display to be read from right to left (opposite to that shown in FIG. 1). The inverse of the described operation is also possible in that a distance or line on a drawing may be measured as a multiple of half-lengths of the calibrated edge 12, of the first embodiment or full lengths of the second embodiment, in addition to the part length indicated by the liquid crystal display, and the real, appropriately scaled value, then indicated numerically by the liquid crystal display 16. As previously described, the electronic measure 10 can be pre-set to indicate any particular division markers corresponding to the division markers of a particular scale rule.

An almost identical operation occurs with the FIG. 3 embodiment, except that, instead of the number of half-lengths, the appropriate number of full lengths of the measure is displayed.

The memory capacity of the electronic measures allows for the storage of a large number of values and thus facilitates the performance of detailed calculations and scale to scale conversions.

When functioning as a protractor, in an operation such as angular measurement, the liquid crystal display 16 displays division markers representing ten degree intervals and the cross-hairs 36 of the viewing piece 34, 50 of the electronic measure are located above the intersection of the lines forming the angle. As an illustration, it is assumed that the angle to be measured is an acute angle. On locating the cross-hairs over the intersection of the lines forming the acute angle, both lines extend from under the calibrated edge 12, 46 in the region of the liquid crystal display 16, 44. The separation of the points at which the lines extend under the calibrated edge is then recorded by means of the movable cursor, and the angular value automatically calculated and displayed. The inverse operation is also possible so that an angular value can be keyed into the electronic measure and the liquid crystal display 16, 44 adapted to display the points at which lines forming such an angle would extend from under the calibrated edge 12 having regard to the required point of intersection of the lines. The quadrant selection key is pressed as previously described if an obtuse or reflex angle is to be measured or drawn and thus measurement or display of angles greater than 90° is possible. The electronic measure, then compensates for the extra multiples of 90°, which in addition to the angle represented by the separation of the cursors, are required represent the complete angle. The function keys 38, 56 also include keys for calculating the sine, cosine or tangent of a particular measured or displayed angle and also provide for conversion between measurement and/or representation in degrees or radians. The electronic measure is thus particularly suited for measurements of length, area or volume related to triangles, quadrilaterals, segments of circles and chords.

A further embodiment is shown in FIGS. 8 and 9. This is identical to the FIG. 3 embodiment, except that in order to facilitate the measurement and display of angles, a transparent protractor element 60 is provided. This comprises a segment of a circle having its centre at the crosswires of the transparent viewing piece. The element is hingedly attached to the undersurface of the calculator by means of an elongate hinge 62. The element can be hinged into the position shown in FIG. 8 when used in angle-calculating or angle-measuring modes or into the position shown in the following FIG. 9 where it is seated in a correspondingly shaped recess 64, when not required. The element is printed with angular divisions at its periphery, and these are connected to indicating lines which extend towards the LCD display, to facilitate the measurement and display of angles.

The dimensions of the measures and the relative dimensions of the elements thereof are not restricted to those illustrated but may be provided at any required value.

The electronic protractor comprising the liquid crystal display 16, the viewing piece 34 and cross-hairs 36, the activation keys 30, 32 and the angular function keys 38, (FIG. 1), is an optional feature and may also be provided as a separate electronic measure, solely capable of performing angular measurements and related calculations.

What is claimed is:

1. A graphic calculator comprising:
   a generally planar base;
   a display on said base, comprising an array of actuatable display elements;
   an angular origin located on said base;
   input means located on said base; and
   calculating means controlled in response to signals from said input means for actuating said actuatable display elements of said array either to display a set of division markers corresponding to a set of scaled division markers of a particular scale rule at a selected scale or to display an angular measurement with respect to said angular origin.

2. A graphic calculator as claimed in claim 1, in which at least some of said actuatable display elements of said array are equally spaced apart.

3. A graphic calculator as claimed in claim 1, wherein said display provides numerical annotation in the region of said display elements.

4. A graphic calculator as claimed in claim 1, wherein said display comprises a liquid crystal display panel.

5. A graphic calculator as claimed in claim 1, in which said calculating comprises means for entering and recording the separation between two points on a scaled drawing, means for entering the relevant scale of said drawing and means for calculating and numerically displaying the real distance represented by the spacing of said points on said drawing having regard to the scale of said drawing.

6. A graphic calculator as claimed in claim 5, wherein said means for entering the relevant scale may also be adapted to initiate a display of a set of said display elements, on the elongate display, of a scale rule, corresponding to the scale of said drawing.

7. A graphic calculator as claimed in claim 1, wherein said display further comprises a numerical display for indicating the scale in use.

8. A graphic calculator as claimed in claim 5, wherein said means for entering and recording the separation between two points on a scaled drawing comprises at least one movable cursor disposed on said array of display elements.

9. A graphic calculator as claimed in claim 8, wherein each element of said display which provides for said moveable cursor also comprises said display element which provides said division marker.

10. A graphic calculator as claimed in claim 9, wherein when a particular display element is required simultaneously to indicate a cursor and a division marker, said display element is visually distinguished from the display elements indicating solely a division marker.

11. A graphic calculator as claimed in claim 1, further comprising means for entering a real value to be represented by the separation of points on a scale drawing, means for entering the relevant scale of the drawing and means for indicating on said display the correct separation of the points on the drawing to represent that real value.

12. A graphic calculator as claimed in claim 1, further comprising an arcuate extension having a straight portion locatable adjacent said display on said base and, in use, extending from said calculator.

13. A graphic calculator as claimed in claim 12, wherein the extension is hingedly connected to the calculator.

14. A graphic calculator as claimed in claim 1, further comprising a numerical display for displaying an angular value measured or required to be drawn.

15. A graphic calculator as claimed in claim 1, wherein said elongate display is preferably located adjacent substantially the complete measuring length of one of the edges of said calculator.

16. A graphic calculator as claimed in claim 14, further comprising means for recording and indicating the number of complete lengths of the calibrated edge which, in addition to the length represented by at least one movable cursor, represents the required separation of points on a drawing.

17. A graphic calculator as claimed in claim 1 wherein said elongate display is located along part of the edge of said calculator and the measure therefore includes means for indicating the number of part lengths of said edge which, in addition to the length represented by the at least one movable cursor, represents the required separation of points on a drawing.

18. A graphic calculator as claimed in claim 1 wherein said angular origin comprises a transparent cross-hair viewer so that the calculator may be accurately located over the intersection of the lines forming an angle to be measured.

19. A graphic calculator as claimed in claim 1 comprising means for recording a point at which at least one line extends from under a measuring edge of the calculator, comprising at least one movable cursor on said display.

20. A graphic calculator as claimed in claim 19 wherein said display is adapted to display any required angle by means of at least one movable cursor provided on the display having regard to the location of the calculator on the drawing surface.

21. A graphic calculator as claimed in claim 1 wherein said array of actuatable display elements comprises a linear array.

22. A graphic calculator as claimed in claim 1 further comprising a plurality of common calculator functions so that linear and/or angular values measured and/or displayed may be directly used in calculations.

* * * * *